Sept. 28, 1937.     H. W. WHITBY     2,094,512
CAPACITOR MOTOR
Filed Aug. 12, 1935
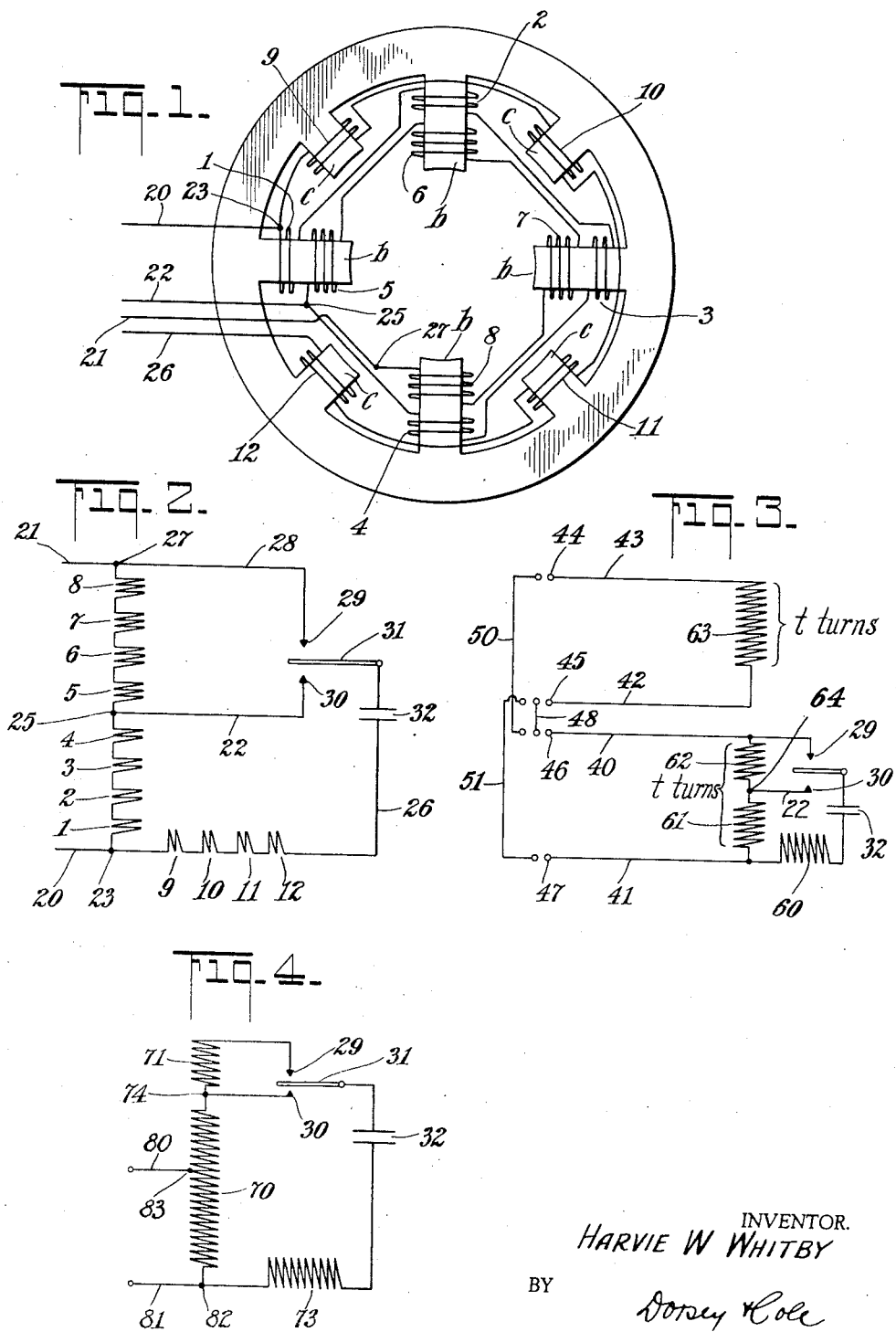
INVENTOR.
HARVIE W WHITBY
BY
Dorsey Cole
ATTORNEYS Patented Sept. 28, 1937

2,094,512

UNITED STATES PATENT OFFICE 2,094,512

CAPACITOR MOTOR

Harvie W. Whitby, Dayton, Ohio, assignor to Sprague Specialties Company, North Adams, Mass., a corporation of Massachusetts Application August 12, 1935, Serial No. 35,862

2 Claims. (Cl. 172—233)

My invention relates to capacitor motors and more particularly to a novel arrangement in subdividing and tapping the main windings of such motors.

My invention will be illustrated in connection with capacitor motors using condensers both for starting the motor and during its normal running operation, but it is not limited to such capacitor motors.

As is well known, capacitor motors of this type are induction motors and comprise as a rule on their stator a main winding and an auxiliary winding, the main winding being usually connected directly across the supply line, whereas the auxiliary winding is connected in series with a suitable condenser, and for starting the motor this series combination is usually placed across the supply line.

The condenser thereby causes the current in the auxiliary winding to be set up substantially in quadrature with the current in the main winding; this provides for a rotating field which is sufficiently strong to enable the motor to start as a two-phase motor.

After the motor has been thus started and has reached or is about to reach its normal operating speed, the auxiliary or starting circuit is either disconnected or preferably, the connections are so altered that the condenser while left in circuit to improve the power factor of the motor, is subjected to a reduced voltage. The reduction of the voltage across the condenser when it is used as "running" condenser is especially important in the case of electrolytic condensers, as these condensers can operate continuously, i. e., as running condensers, only at considerably lower voltages than they can be subjected to intermittently, i. e., as "starting" condensers.

To obtain the proper reduced voltage across the condenser for its operation as running condenser, various arrangements have been suggested, generally using one or more taps provided in the main motor winding or in the auxiliary winding, which taps are arranged in such a manner that the main or auxiliary winding is distributed in a plurality of coils and the taps taken out at some selected points of the winding.

In the arrangements now used, however, an unbalancing of the current takes place in such a manner that the current flowing between the tap and one side of the line is larger than the current flowing between the tap and the opposite side of the line. Such unbalanced currents cause in turn an unsymmetrical field distribution which results in a noisy motor. This has been a considerable drawback of such motors.

My present invention eliminates the above motor noise by producing an absolutely balanced current distribution and symmetrical arrangement, with equal currents flowing between the tap and each of the lines and by thus providing a symmetrical field.

According to a preferred embodiment of my invention, I subdivide the main winding in such a manner as to place on each pole two coils thereof. The number of turns of these coils are determined as follows:

Assumed that the total number of turns of the main winding is N and the number of poles $p$; furthermore, that the total number of turns between the tap and one side of the line is X and between the tap and the other line is Y. Thus $N=X+Y$.

Of the two coils on each pole, one is to have a number of turns $$n_1 = \frac{X}{p}$$

and the other is to have a number of turns $$n_2 = \frac{Y}{p}$$

The coils having $n_1$ turns and provided on successive poles are first connected in series, whereby the end of the last coil provides for the tap and is also connected in series with the successive coils having $n_2$ turns.

My invention lends itself to various modifications and will be explained in connection with the drawing.

In the drawing forming part of the specification:

Figure 1 is a schematic showing of the stator of a capacitor motor wound in accordance with my invention;

Fig. 2 is a schematic circuit diagram showing the connections of a motor in accordance with my invention;

Fig. 3 is a schematic circuit diagram of a motor in accordance with my invention, adapted to be connected to different supply voltages;

Fig. 4 is a schematic circuit diagram of a motor in accordance with my invention in which the stator winding serves as an autotransformer for the running voltage of the condenser.

Referring to Figure 1, the drawing shows the stator of a capacitor motor wound in accordance with my invention. In the drawing the stator is shown to have four main poles $b$ and four auxiliary poles c. Assumed that the motor in question requires a main winding having a total of 150 turns per pole, and with a given auxiliary winding would require the tap in the main winding to be at the 200th turn (so as to obtain for running conditions the desired reduced voltage across the condenser 32, which is connected in accordance with the circuit diagram of Fig. 2, to be later discussed), then in accordance with the invention each main pole is to be provided with two coils, one having 50 turns and the other 100 turns; the coils 1, 2, 3, and 4 each having 50 turns and the coils 5, 6, 7, and 8 having 100 turns. The supply line 20 is thereby connected at 23 with one end of coil 1 and the coils 1—4 are connected in series in proper sequence and direction, the end 25 of coil 4 representing the tap 25, which is connected to lead 22. The tap 25 is furthermore connected in series with the successive coils 5—8, the free end 27 of coil 8 being connected to the other supply line 21. The auxiliary windings 9, 10, 11, and 12 are connected between line 20 and a lead 26.

It will appear that with such a connection a symmetrical field distribution will be obtained under any conditions, as the current changes between the tap 25 and the leads 20 and 21 respectively will affect all four poles in the same manner and thus a balanced condition will be maintained.

Referring now to Fig. 2, it will be seen that one pole of the condenser 32 is connected through lead 26 to one end of the series connection of the auxiliary windings 9—12, and its other pole is connected to a contactor 31, which as a rule is a centrifugally-operated contactor of known design. During starting, contactor 31 contacts with contact 29, whereby the series arrangement of the condenser 32 and of the auxiliary windings 9 and 12 is connected across the supply lines 20—21.

When the motor has assumed, or is about to assume its normal running speed, the contactor 31 moves to contact with contact 30, thereby connecting the series combination of the condenser 32 and of the auxiliary winding across line 20 and tap 25, thus reducing the voltage across this combination.

Fig. 3 shows an arrangement similar to that of Fig. 2, except that the capacitor motor can be operated at either one of two voltages, for example at either 110 or 220 volts. The windings 61 and 62 thereby correspond to the coils 1 to 4 and the coils 5 to 8 respectively of the main winding of Fig. 2. Winding 60 represents the coils of the auxiliary winding. The total number of turns of windings 61 and 62 is $t$, and a further winding 63 having also a number of turns $t$ is applied to the stator. Leads 40 to 41 connected to the free ends of windings 61 and 62 have terminals 46 and 47, and leads 42 and 43 connected across winding 63 have terminals 44 and 45. Suitable contactors or jumpers, shown as 48, 50 and 51, are provided, whereby the jumpers 50 and 51 are connecting terminal 44 with terminal 46 and terminal 45 with terminal 47 respectively, the coil 63 is placed in parallel with winding 61—62, and the motor is adapted to operate at 110 volts, whereas when instead of making the above connections, jumper 48 bridges terminals 45 and 46, winding 63 is placed in series with winding 61—62 and the motor is adapted to operate at 220 volts.

Fig. 4 shows a circuit arrangement for a capacitor motor in which the voltage to be applied to the condenser is in excess of the net voltage, such being sometimes desirable, especially when the condenser is not of the electrolytic type, but for instance, an oil- or wax-impregnated paper condenser, and the supply voltage is lower than required for the best utilization of such condensers. In this arrangement the tap 74 is again so selected as to provide a balanced distribution between the portions 70 and 71 of the main winding, whereas for the starting and even for running the voltage across the auxiliary circuit is considerably in excess of the supply voltage.

While I have described my invention in connection with specific examples and in specific applications, I do not wish to be limited thereto, but desire the appended claims to be construed as broadly as permissible in view of the prior art.

What I claim is:

1. In a capacitor motor in combination, a stator having a plurality of main poles and auxiliary poles, two series-connected main windings each comprising a plurality of coils one on each main pole, an auxiliary winding comprising a plurality of series-connected coils, one on each auxiliary pole, a condenser connected in series with said auxiliary winding, and means to connect said condenser and auxiliary winding across both main windings during starting and across said first main winding during running, the number of turns of said first main winding being selected to produce a predetermined running voltage across said condenser.

2. In a capacitor motor in combination, a stator having a plurality of main poles and auxiliary poles, two series-connected main windings each comprising a plurality of coils having the same number of turns and disposed one on each of said main poles, an auxiliary winding comprising a plurality of series-connected coils one on each auxiliary pole, an electrolytic condenser connected in series with said auxiliary winding and having an operating voltage less than the operating voltage of the motor, and means to connect said condenser and auxiliary winding across both main windings during starting and across only the first main winding during running, the number of turns of said first main winding being selected to produce across said condenser during running a predetermined voltage substantially equal to the operating voltage of the condenser.

HARVIE W. WHITBY.